(12) United States Patent
Li

(10) Patent No.: US 10,067,503 B2
(45) Date of Patent: Sep. 4, 2018

(54) METHOD FOR RECORDING FLIGHT PATH AND CONTROLLING AUTOMATIC FLIGHT OF UNMANNED AERIAL VEHICLE

(71) Applicant: Shenzhen Hubsan Technology Co., Ltd., Shenzhen (CN)

(72) Inventor: GuangJun Li, Shenzhen (CN)

(73) Assignee: Shenzhen Hubsan Technology Co., Ltd., Shenzhen (CN)

( * ) Notice: Subject to any disclaimer, the term of this patent is extended or adjusted under 35 U.S.C. 154(b) by 121 days.

(21) Appl. No.: 15/298,383

(22) Filed: Oct. 20, 2016

(65) Prior Publication Data
US 2017/0315545 A1 Nov. 2, 2017

(30) Foreign Application Priority Data
Apr. 29, 2016 (CN) .......................... 2016 1 0279204

(51) Int. Cl.
*G05D 1/00* (2006.01)
*G05D 1/10* (2006.01)
(Continued)

(52) U.S. Cl.
CPC ............ *G05D 1/005* (2013.01); *B64C 39/024* (2013.01); *G01S 19/42* (2013.01); *G05D 1/0016* (2013.01);
(Continued)

(58) Field of Classification Search
CPC ...... G05D 1/005; G05D 1/101; G05D 1/0016; B64C 39/024; G01S 19/42; G06N 99/005; B65C 2201/145; B65C 2201/146
(Continued)

(56) References Cited

U.S. PATENT DOCUMENTS 9,507,019 B1 * 11/2016 Lyon .................... H01Q 3/04
9,618,940 B1 * 4/2017 Michini ................. G05D 1/101
(Continued)

*Primary Examiner* — Krishnan Ramesh
(74) *Attorney, Agent, or Firm* — IPro, PLLC; Na Xu

(57) ABSTRACT

The invention provides a method for recording a flight path and controlling automatic flight of an unmanned aerial vehicle. The method includes: controlling, by a remote control or a smart mobile terminal device, the unmanned aerial vehicle to fly following a certain flight path according to user's requirement, triggering the unmanned aerial vehicle to record the flight path, storing tracking data, and selecting a learning track to fly automatically, where a flight mode comprises at least GPS learning mode, GPS automatic mode, and manual mode. The unmanned aerial vehicle having the control mode can be triggered to fly automatically following the tracking data stored in the flight control device according to different application scenarios, thus increasing the user experience and entertainment. In the process of recording track, the unmanned aerial vehicle can fly at a low speed and meanwhile avoid obstacles, when flying automatically, the unmanned aerial vehicle can fly fast in a racing mode, further increasing the user experience. Meanwhile, in the automatic flight at a low speed, the unmanned aerial vehicle can take photographs, and the shot images are stable and clear. In certain application scenarios requiring a terrain recorder to record the track, through learning the actual flight track, it is unnecessary to employ other devices, thus saving the user's costs.

4 Claims, 3 Drawing Sheets

(51) Int. Cl.
    *B64C 39/02* (2006.01)
    *G01S 19/42* (2010.01)
    *G06N 99/00* (2010.01)
(52) U.S. Cl.
    CPC ........... *G05D 1/101* (2013.01); *G06N 99/005* (2013.01); *B64C 2201/145* (2013.01); *B64C 2201/146* (2013.01)
(58) Field of Classification Search
    USPC .......................................................... 701/2
    See application file for complete search history.

(56) References Cited

U.S. PATENT DOCUMENTS

| | | | |
|---|---|---|---|
| 9,714,089 B1 * | 7/2017 | Louw | B64C 39/024 |
| 9,859,972 B2 * | 1/2018 | Jalali | H04B 7/18504 |
| 2016/0307447 A1 * | 10/2016 | Johnson | G05D 1/0044 |

* cited by examiner

METHOD FOR RECORDING FLIGHT PATH AND CONTROLLING AUTOMATIC FLIGHT OF UNMANNED AERIAL VEHICLE

FIELD OF THE INVENTION

The invention relates to the field of aviation technology, and more particularly to a method for recording a flight path and controlling automatic flight of an unmanned aerial vehicle.

BACKGROUND OF THE INVENTION

Typically, the unmanned aerial vehicles have two kinds of flight modes, that is, manual flight by remote control and autonomous flight by navigation. The autonomous flight by navigation is mainly dependent on GPS, and the flight route is set on the satellite map in advance by a ground station or a smart terminal device, so that the unmanned aerial vehicles fly following each destination in the flight route, thus achieving the objective of autonomous flight.

Chinese Patent Application No. 201210312668.0, titled "method and device for compiling and controlling flight route", discloses a method for compiling and controlling flight route. The method includes clicking and confirming the flight destinations in the compiling interface, calculating the flight distances between the flight destinations, compiling the flight route according to the flight distances between the flight destinations, transmitting the flight route to the unmanned aerial vehicle, and controlling the unmanned aerial vehicle to fly following the fight route.

Chinese Patent Application No. 201210328788.X, titled "method of flight route planning and long-range synchronous manipulation of unmanned aerial vehicle", discloses a method of flight route planning and long-range synchronous manipulation of an unmanned aerial vehicle. The flight route planning refers to setting longitude and latitude coordinates, by which the unmanned aerial vehicle is bound to pass, on a smart mobile device, transmitting the coordinate data to a flight control plate, comparing the data with current coordinates measured by a GPS receiver of the unmanned aerial vehicle, and calculating the yaw angle and yaw distance, thus achieving the objective of navigation.

Actually, the above-mentioned two flight route planning is formulated by operators by means of a ground station or smart mobile terminal device based on existing satellite map. Because the accuracy of the satellite map is limited, and the operation of the operators has a certain error, the flight route planning method has uncertain factors and high risks.

SUMMARY OF THE INVENTION

In view of the above-described problems, it is one objective of the invention to provide a method for recording a flight path and controlling automatic flight of an unmanned aerial vehicle.

To achieve the above objective, the following technical solutions are provided.

A method for recording a flight path and controlling automatic flight of an unmanned aerial vehicle, comprises: controlling, by a remote control or a smart mobile terminal device, the unmanned aerial vehicle to fly following a certain flight path according to user's requirement, triggering the unmanned aerial vehicle to record the flight path, storing tracking data, and selecting a learning track to fly automatically, where a flight mode comprises at least GPS learning mode, GPS automatic mode, and manual mode.

As an improvement of the present disclosure, prior to taking off or in the process of taking off, the unmanned aerial vehicle is triggered and selected to enter the GPS learning mode, entering the GPS learning mode requires satisfying certain conditions including but not limited to a signal being detected in a GPS sensor, or a warning is issued, and the GPS learning mode is unexecuted.

As an improvement of the present disclosure, prior to entering the GPS automatic mode, the unmanned aerial vehicle is selected to fly according to a prestored path or fly according to a navigation path preset by another mode, and an automatic flight speed, radius of turning circle, course-keeping flight parameters, whether to perform cyclic flight, and times of cyclic flight are selected; the unmanned aerial vehicle is selected to enter the GPS automatic mode on the ground or in the flight process, entering the GPS automatic mode requires satisfying certain conditions including but not limited to a signal being detected in a GPS sensor, or a warning is issued, and the GPS automatic mode is unexecuted.

As an improvement of the present disclosure, in the process of track learning, when a previous learning track is required to suspend, abandon, terminate and store in real time, triggering modes of the suspension, abandonment, termination and storage are similar to triggering the learning mode; when current environments fail to satisfy conditions for the track learning, a warning is issued to indicate the conditions for the track learning are unsatisfied;

in the process of track learning, tracking data to be stored includes but is not limited to data of position location sensor GPS, barometer data, height sensor data, the tracking data is stored in a storage medium of a flight control system;

in the process of track learning, the number of the data in the track is determined by the flight speed, which is a variable related to time and set in accordance with specific conditions;

in the process of track learning, a current flight path or a plurality of flight paths are stored as per user's selection, the stored flight path can be recompiled according to user's requirement, including but not limited to name, time and comments of the flight path;

in the process of track learning, a warning is issued when the number of track storage reaches a preset value or storage space is insufficient, indicating full storage or the storage space is insufficient; in case of full storage, the current track learning is automatically terminated and a warning is issued, the warning including but not limited to voice, light flashing, and shaking;

in the process of track learning, when a user decides to suspend the learning, the unmanned aerial vehicle pauses the data recording, and at the moment the unmanned aerial vehicle is capable of hovering or flies under manipulation of the user until the user triggers continuous learning;

in the process of track learning, when a user selects to abandon the current track learning, or the unmanned aerial vehicle loses GPS position signal in a continuous period of time, a warning is issued to terminate the current learning, the warning including but not limited to voice, light flashing, and shaking; and at the end of track learning, after the user triggers to store the current learning track, whether the storage succeeds or fails, a warning is issued to indicate that the learning track is successful or unsuccessful.

As an improvement of the present disclosure, after entering the GPS automatic mode, the unmanned aerial vehicle calculates a distance between a current position and an initial position of the flight path, as well as a total distance of the flight path, and then determines whether the total flight path can be completed based on batteries' capacity, if it is determined the flight path cannot be completed, the automatic flight is unexecuted, and a warning is issued, the warning including but not limited to voice, light flashing, and shaking;

in the process of automatic flight, the unmanned aerial vehicle flies according to preset track, speed, and flight mode, suspends flying when a suspension device is triggered, when suspension, the unmanned aerial vehicle stays in a hovering state, and continues the current flying task when a resuming device is triggered; in the flight process, the user can switch the unmanned aerial vehicle to be in a manual flight mode, or make the unmanned aerial vehicle return, or land the unmanned aerial vehicle by triggering an ending automatic flight device;

after the automatic flight is completed, a warning is issued from the unmanned aerial vehicle, the warning including but not limited to voice, light flashing, and shaking, or the unmanned aerial vehicle hovers, makes a return voyage, or lands;

the user can select to delete a completed flight path, or set to automatically delete the completed flight path, and compile stored flight paths as needed.

The present invention also provides an apparatus, when being triggered, enabling an unmanned aerial vehicle to enter GPS learning mode, the apparatus including but not limited to a solid key of a remote control, a software key of a ground control system or smart mobile device.

The present invention further provides an apparatus, when being triggered, enabling an unmanned aerial vehicle to enter GPS automatic mode, the apparatus including but not limited to a solid key of a remote control, a software key of a ground control system or smart mobile device.

Advantages of the method for recording a flight path and controlling automatic flight of an unmanned aerial vehicle are summarized as follows. The unmanned aerial vehicle having the control mode can be triggered to fly automatically following the tracking data stored in the flight control device according to different application scenarios, thus increasing the user experience and entertainment. In the process of recording track, the unmanned aerial vehicle can fly at a low speed and meanwhile avoid obstacles, when flying automatically, the unmanned aerial vehicle can fly fast in a racing mode, further increasing the user experience. Meanwhile, in the automatic flight at a low speed, the unmanned aerial vehicle can take photographs, and the shot images are stable and clear. In certain application scenarios requiring a terrain recorder to record the track, through learning the actual flight track, it is unnecessary to employ other devices, thus saving the user's costs.

DETAILED DESCRIPTION OF THE EMBODIMENTS

To further illustrate the invention, experiments detailing a method for recording a flight path and controlling automatic flight of an unmanned aerial vehicle are described below. It should be noted that the following examples are intended to describe and not to limit the invention.

Figure 1:
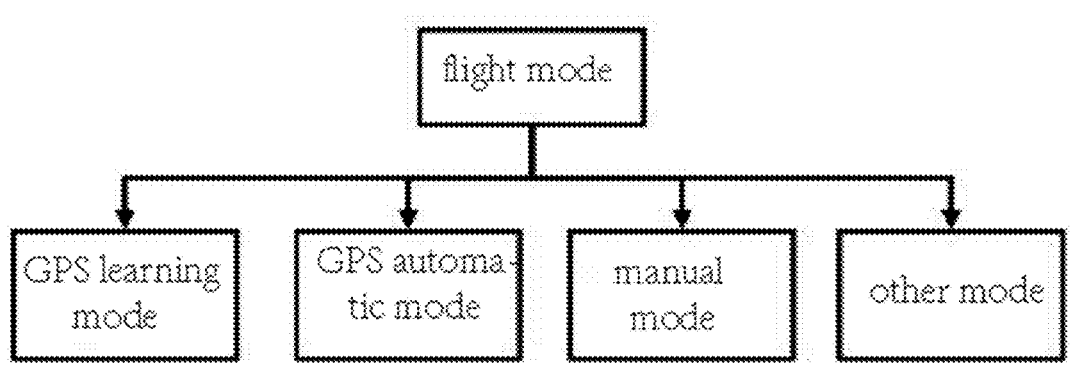
FIG. 1 is a structural diagram of flight modes of an unmanned aerial vehicle in accordance to one embodiment of the present invention.
Figure 2:
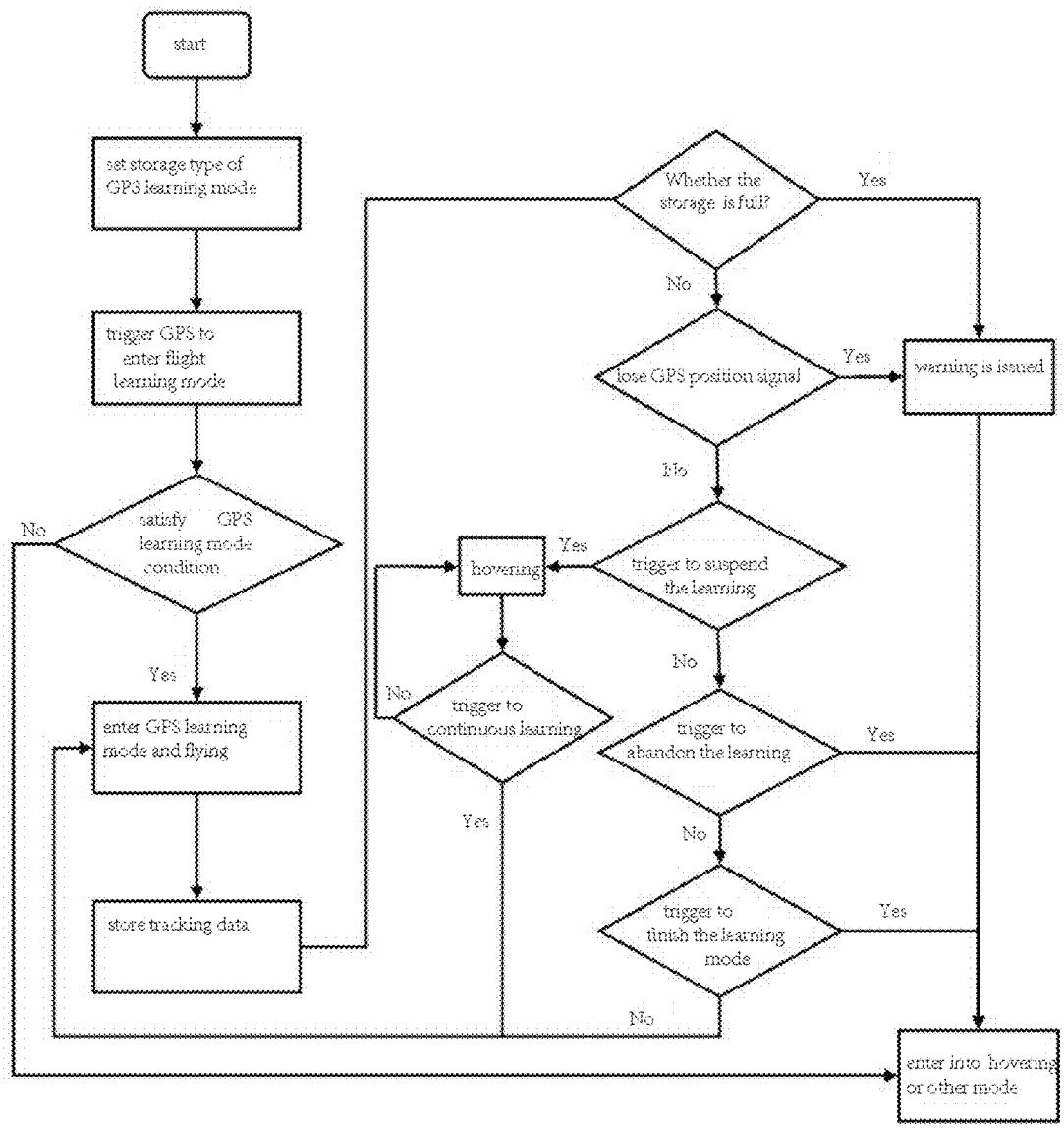
FIG. 2 is a flow chart of track leaning of an unmanned aerial vehicle in a GPS learning mode in accordance to one embodiment of the present invention.
Figure 3:
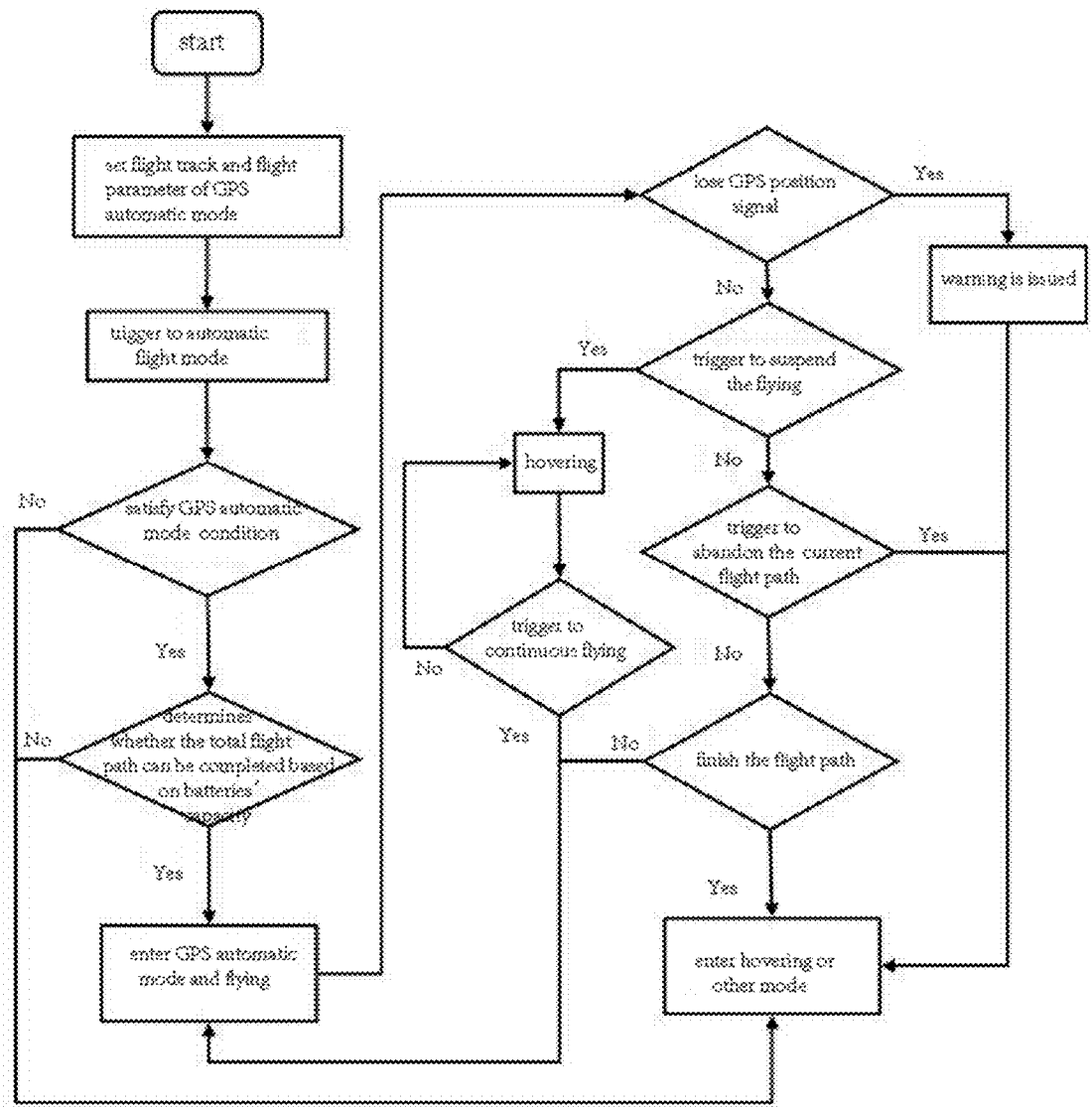
FIG. 3 is a flow chart of task execution of an unmanned aerial vehicle in a GPS automatic mode in accordance to one embodiment of the present invention.

As shown in FIGS. 1-3, a method for recording a flight path and controlling automatic flight of an unmanned aerial vehicle, comprises: controlling, by a remote control or a smart mobile terminal device, the unmanned aerial vehicle to fly following a certain flight path according to user's requirement, triggering the unmanned aerial vehicle to record the flight path transmitted by GPS and other sensor, storing tracking data, and selecting a learning track to fly automatically, where a flight mode comprises at least GPS learning mode, GPS automatic mode, and manual mode.

The present disclosure also provides an apparatus, which, when being triggered, enables an unmanned aerial vehicle to enter GPS learning mode, the apparatus including but not limited to a solid key of a remote control, a software key of a ground control system or smart mobile device.

Prior to taking off or in the process of taking off, the unmanned aerial vehicle is triggered and selected to enter the GPS learning mode, entering the GPS learning mode requires satisfying certain conditions including but not limited to a signal being detected in a GPS sensor, or a warning is issued, and the GPS learning mode is unexecuted.

In the process of track learning, when a previous learning track is required to suspend, abandon, terminate and store in real time, triggering modes of suspension, abandonment, termination and storage are similar to triggering a learning mode; when current environments fail to satisfy conditions for the track learning, a warning is issued to indicate the conditions for the track learning are unsatisfied;

in the process of track learning, tracking data to be stored includes but is not limited to data of position location sensor GPS, barometer data, height sensor data, the tracking data is stored in a storage medium of a flight control system;

in the process of track learning, the number of the data in the track is determined by the flight speed, which is a variable related to time and set in accordance with specific conditions;

in the process of track learning, a current flight path or a plurality of flight paths are stored as per user's selection, the stored flight path can be recompiled according to user's requirement, including but not limited to name, time and comments of the flight path;

in the process of track learning, a warning is issued when a number of track storage reaches a preset value or storage space is insufficient, indicating full storage or the storage space is insufficient; in case of full storage, the current track learning is automatically terminated and a warning is issued, the warning including but not limited to voice, light flashing, and shaking;

in the process of track learning, when a user decides to suspend the learning, the unmanned aerial vehicle pauses the data recording, at the moment the unmanned aerial vehicle is capable of hovering or flies under manipulation of the user until the user triggers continuous learning;

in the process of track learning, when a user selects to abandon the current track learning, or the unmanned aerial vehicle loses GPS position signal in a continuous period of time, a warning is issued to terminate the current learning, the warning including but not limited to voice, light flashing, and shaking; and at the end of track learning, after the user triggers to store the current learning track, whether the storage succeeds or fails, a warning is issued to indicate that the learning track is successful or unsuccessful.

The present disclosure further provides an apparatus, which, when being triggered, enables an unmanned aerial vehicle to enter GPS automatic mode, the apparatus including but not limited to a solid key of a remote control, a software key of a ground control system or smart mobile device.

Prior to entering the GPS automatic mode, the unmanned aerial vehicle is selected to fly according to a prestored path or fly according to a navigation path preset by another mode, and an automatic flight speed, radius of turning circle, course-keeping flight parameters, whether to perform cyclic flight, and times of cyclic flight are selected; the unmanned aerial vehicle is selected to enter the GPS automatic mode on the ground or in the flight process, entering the GPS automatic mode requires satisfying certain conditions including but not limited to a signal being detected in a GPS sensor, or a warning is issued, and the GPS automatic mode is unexecuted.

After entering the GPS automatic mode, the unmanned aerial vehicle calculates a distance between a current position and an initial position of the flight path, as well as a total distance of the flight path, and then determines whether the total flight path can be completed based on batteries' capacity, if it is determined the flight path cannot be completed, the automatic flight is unexecuted, and a warning is issued, the warning including but not limited to voice, light flashing, and shaking;

in the process of automatic flight, the unmanned aerial vehicle flies according to preset track, speed, and flight mode, suspends flying when a suspension device is triggered, when suspension, the unmanned aerial vehicle stays in a hovering state, and continues the current flying task when a resuming device is triggered; in the flight process, the user can switch the unmanned aerial vehicle to be in a manual flight mode, or make the unmanned aerial vehicle return, or land the unmanned aerial vehicle by triggering an ending automatic flight device;

after the automatic flight is completed, a warning is issued from the unmanned aerial vehicle, the warning including but not limited to voice, light flashing, and shaking, or the unmanned aerial vehicle hovers, makes a return voyage, or lands;

the user can select to delete a completed flight path, or set to automatically delete the completed flight path, and compile stored flight paths as needed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for recording a flight path and controlling automatic flight of an unmanned aerial vehicle, characterized by comprising:

controlling, by a remote control or a smart mobile terminal device, the unmanned aerial vehicle to fly following a certain flight path according to user's requirement,
triggering the unmanned aerial vehicle to record the flight path,
storing tracking data, and selecting a learning track to fly automatically, where a flight mode comprises at least GPS learning mode, GPS automatic mode, and manual mode;

wherein prior to taking off or in the process of taking off, the unmanned aerial vehicle is triggered and selected to enter the GPS learning mode, and entering the GPS learning mode requires satisfying certain conditions including a signal being detected in a GPS sensor, or a warning is issued, and the GPS learning mode is unexecuted;

wherein in the process of track learning, when a previous learning track is required to suspend, abandon, terminate and store in real time, triggering modes of suspension, abandonment, termination and storage are similar to triggering a learning mode;

wherein when current environments fail to satisfy conditions for the track learning, a warning is issued to indicate the conditions for the track learning are unsatisfied;

wherein in the process of track learning, tracking data to be stored includes data of position location sensor GPS, barometer data, height sensor data;

wherein the tracking data is stored in a storage medium of a flight control system;

wherein in the process of track learning, the number of data in the track is determined by the flight speed, which is a variable related to time and set in accordance with specific conditions;

wherein in the process of track learning, a current flight path or a plurality of flight paths are stored as per user's selection;

wherein the stored flight path is recompiled according to user's requirement, including name, time and comments of the flight path;

wherein in the process of track learning, a warning is issued when a number of track storage reaches a preset value or storage space is insufficient, indicating full storage or the storage space is insufficient;

wherein in case of full storage, the current track learning is automatically terminated and a warning is issued, and the warning includes voice, light flashing, and shaking;

wherein in the process of track learning, when a user decides to suspend the learning, the unmanned aerial vehicle pauses the data recording, at the moment the unmanned aerial vehicle is capable of hovering or flies under manipulation of the user until the user triggers continuous learning;

wherein in the process of track learning, when a user selects to abandon the current track learning, or the unmanned aerial vehicle loses GPS position signal in a continuous period of time, a warning is issued to terminate the current learning, the warning including voice, light flashing, and shaking; and wherein at the end of track learning, after the user triggers to store the current learning track, whether the storage succeeds or fails, a warning is issued to indicate that the learning track is successful or unsuccessful.

2. A method for recording a flight path and controlling automatic flight of an unmanned aerial vehicle, characterized by comprising:

controlling, by a remote control or a smart mobile terminal device, the unmanned aerial vehicle to fly following a certain flight path according to user's requirement,
triggering the unmanned aerial vehicle to record the flight path,
storing tracking data, and selecting a learning track to fly automatically, where a flight mode comprises at least GPS learning mode, GPS automatic mode, and manual mode;

wherein prior to entering the GPS automatic mode, the unmanned aerial vehicle is selected to fly according to a prestored path or fly according to a navigation path preset by another mode, and an automatic flight speed, radius of turning circle, course-keeping flight parameters, whether to perform cyclic flight, and times of cyclic flight are selected;

wherein the unmanned aerial vehicle is selected to enter the GPS automatic mode on the ground or in the flight process, entering the GPS automatic mode requires satisfying certain conditions including a signal being detected in a GPS sensor, or a warning is issued, and the GPS automatic mode is unexecuted;

wherein after entering the GPS automatic mode, the unmanned aerial vehicle calculates a distance between a current position and an initial position of the flight path, as well as a total distance of the flight path, and then determines whether the total flight path is completed based on batteries' capacity;

wherein if it is determined the flight path cannot be completed, the automatic flight is unexecuted, and a warning is issued, the warning including voice, light flashing, and shaking;

wherein in the process of automatic flight, the unmanned aerial vehicle flies according to preset track, speed, and flight mode, suspends flying when a suspension device is triggered, when suspension, the unmanned aerial vehicle stays in a hovering state, and continues the current flying task when a resuming device is triggered;

wherein in the flight process, the user can switch the unmanned aerial vehicle to be in a manual flight mode, or make the unmanned aerial vehicle return, or land the unmanned aerial vehicle by triggering an ending automatic flight device;

wherein after the automatic flight is completed, a warning is issued from the unmanned aerial vehicle, the warning including voice, light flashing, and shaking, or the unmanned aerial vehicle hovers, makes a return voyage, or lands;

wherein the user can select to delete a completed flight path, or set to automatically delete the completed flight path, and compile stored flight paths as needed.

3. An apparatus, when being triggered, enabling an unmanned aerial vehicle to enter GPS learning mode, wherein the apparatus comprises a solid key of a remote control, a software key of a ground control system or smart mobile device;

wherein the apparatus is configured for controlling, by a remote control or a smart mobile terminal device, the unmanned aerial vehicle to fly following a certain flight path according to user's requirement,
triggering the unmanned aerial vehicle to record the flight path,
storing tracking data, and
selecting a learning track to fly automatically, wherein a flight mode comprises at least GPS learning mode, GPS automatic mode, and manual mode;

wherein prior to taking off or in the process of taking off, the unmanned aerial vehicle is triggered and selected to enter the GPS learning mode, entering the GPS learning mode requires satisfying certain conditions including a signal being detected in a GPS sensor, or a warning is issued, and the GPS learning mode is unexecuted;

wherein in the process of track learning, when a previous learning track is required to suspend, abandon, terminate and store in real time, triggering modes of suspension, abandonment, termination and storage are similar to triggering a learning mode;

wherein when current environments fail to satisfy conditions for the track learning, a warning is issued to indicate the conditions for the track learning are unsatisfied;

wherein in the process of track learning, tracking data to be stored includes data of position location sensor GPS, barometer data, height sensor data;

wherein the tracking data is stored in a storage medium of a flight control system;

wherein in the process of track learning, the number of data in the track is determined by the flight speed, which is a variable related to time and set in accordance with specific conditions;

wherein in the process of track learning, a current flight path or a plurality of flight paths are stored as per user's selection;

wherein the stored flight path is recompiled according to user's requirement, including name, time and comments of the flight path;

wherein in the process of track learning, a warning is issued when a number of track storage reaches a preset value or storage space is insufficient, indicating full storage or the storage space is insufficient;

wherein in case of full storage, the current track learning is automatically terminated and a warning is issued, and the warning includes voice, light flashing, and shaking;

wherein in the process of track learning, when a user decides to suspend the learning, the unmanned aerial vehicle pauses the data recording, at the moment the unmanned aerial vehicle is capable of hovering or flies under manipulation of the user until the user triggers continuous learning;

wherein in the process of track learning, when a user selects to abandon the current track learning, or the unmanned aerial vehicle loses GPS position signal in a continuous period of time, a warning is issued to terminate the current learning, the warning including voice, light flashing, and shaking; and wherein at the end of track learning, after the user triggers to store the current learning track, whether the storage succeeds or fails, a warning is issued to indicate that the learning track is successful or unsuccessful.

4. An apparatus, when being triggered, enabling an unmanned aerial vehicle to enter GPS automatic mode, wherein the apparatus comprises a solid key of a remote control, a software key of a ground control system or smart mobile device;

wherein the apparatus is configured for controlling, by a remote control or a smart mobile terminal device, the unmanned aerial vehicle to fly following a certain flight path according to user's requirement,
triggering the unmanned aerial vehicle to record the flight path,
storing tracking data, and
selecting a learning track to fly automatically, where a flight mode comprises at least GPS learning mode, GPS automatic mode, and manual mode;

wherein prior to entering the GPS automatic mode, the unmanned aerial vehicle is selected to fly according to a prestored path or fly according to a navigation path preset by another mode, and an automatic flight speed, radius of turning circle, course-keeping flight parameters, whether to perform cyclic flight, and times of cyclic flight are selected;

wherein the unmanned aerial vehicle is selected to enter the GPS automatic mode on the ground or in the flight process, entering the GPS automatic mode requires satisfying certain conditions including a signal being detected in a GPS sensor, or a warning is issued, and the GPS automatic mode is unexecuted;

wherein after entering the GPS automatic mode, the unmanned aerial vehicle calculates a distance between a current position and an initial position of the flight path, as well as a total distance of the flight path, and then determines whether the total flight path is completed based on batteries' capacity;

wherein if it is determined the flight path cannot be completed, the automatic flight is unexecuted, and a warning is issued, the warning including voice, light flashing, and shaking;

wherein in the process of automatic flight, the unmanned aerial vehicle flies according to preset track, speed, and flight mode, suspends flying when a suspension device is triggered, when suspension, the unmanned aerial vehicle stays in a hovering state, and continues the current flying task when a resuming device is triggered;

wherein in the flight process, the user can switch the unmanned aerial vehicle to be in a manual flight mode, or make the unmanned aerial vehicle return, or land the unmanned aerial vehicle by triggering an ending automatic flight device;

wherein after the automatic flight is completed, a warning is issued from the unmanned aerial vehicle, the warning including voice, light flashing, and shaking, or the unmanned aerial vehicle hovers, makes a return voyage, or lands;

wherein the user can select to delete a completed flight path, or set to automatically delete the completed flight path, and compile stored flight paths as needed.

* * * * *